(12) United States Patent
Linnartz et al.

(10) Patent No.: US 12,047,120 B2
(45) Date of Patent: Jul. 23, 2024

(54) MULTI-TRANSCEIVER SYSTEM WITH SELECTIVE TRANSMIT BRANCH COMBINATION FOR OPTICAL WIRELESS COMMUNICATION

(71) Applicant: SIGNIFY HOLDING B.V., Eindhoven (NL)

(72) Inventors: Johan-Paul Marie Gerard Linnartz, Eindhoven (NL); Paul Henricus Johannes Maria Van Voorthuisen, Sint Oedenrode (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 89 days.

(21) Appl. No.: 17/919,550

(22) PCT Filed: Apr. 20, 2021

(86) PCT No.: PCT/EP2021/060218
§ 371 (c)(1),
(2) Date: Oct. 18, 2022

(87) PCT Pub. No.: WO2021/219435
PCT Pub. Date: Nov. 4, 2021

(65) Prior Publication Data
US 2023/0198628 A1    Jun. 22, 2023

(30) Foreign Application Priority Data

Apr. 28, 2020    (EP) ..................... 20171742

(51) Int. Cl.
*H04B 10/58* (2013.01)
*H04B 10/114* (2013.01)
(Continued)

(52) U.S. Cl.
CPC .......... *H04B 10/58* (2013.01); *H04B 10/1143* (2013.01); *H04B 10/1149* (2013.01); *H04B 10/116* (2013.01); *H04B 10/516* (2013.01)

(58) Field of Classification Search
CPC ..... H04B 10/112; H04B 10/11; H04B 10/118; H04J 11/00; H04J 14/06
(Continued)

(56) References Cited

U.S. PATENT DOCUMENTS 9,503,187 B2 *   11/2016   Habel ................. H04J 14/0227
10,148,336 B2 *  12/2018   Kinamon ................. H04L 5/00
(Continued)

OTHER PUBLICATIONS

Ying Kai et al., Joint Optimization of Precoder and Equalizer in MIMO VLC System (Year: 2015).*
(Continued)

*Primary Examiner* — Abbas H Alagheband (57) ABSTRACT

A LiFi system having multiple transceivers (11) and a single multiple-input-multiple-output (MIMO) modem (41) with at least M outputs, wherein the M transmit outputs of the MIMO modem (41) are fed to a linear combiner (42). The linear combiner creates M distinct linear combinations based on the N MIMO transmit branch signals of the MIMO modem and the linear combinations are chosen such that they allow decoding of each of the 5 N MIMO transmit branch signals when N of the M distinct output signals are received.

15 Claims, 7 Drawing Sheets

(51) Int. Cl.
*H04B 10/116* (2013.01)
*H04B 10/516* (2013.01)

(58) Field of Classification Search
USPC .......................................................... 398/130
See application file for complete search history.

(56) References Cited

U.S. PATENT DOCUMENTS

| 2017/0201321 | A1* | 7/2017 | Uysal | H04B 10/116 |
| 2017/0338874 | A1* | 11/2017 | Pratt | H04B 7/0862 |
| 2017/0346559 | A1* | 11/2017 | Eroglu | H04B 10/07953 |
| 2021/0159976 | A1* | 5/2021 | Arikawa | H04B 10/112 |
| 2023/0006719 | A1* | 1/2023 | Ashrafi | H04B 7/0413 |

OTHER PUBLICATIONS

Ki-Hong Park, et al., On the Power and Offset Allocation for Rate Adaptation of Spatial Multiplexing in Optical Wireless MIMO Channels, (Year: 2013).*

Ribeiro Barbio Correa, et al., "POF Feeding in Li-Fi Systems with MIMO Approach", Eindhoven University of Technology, 24th Annual IEEE Photonics Benelux Symposium 2019, Amsterdam, The Netherlands, published Jan. 1, 2019, pp. 1-5.

Thilo Fath, et al., "Performance Comparison of MIMO Techniques for Optical Wireless Communications in Indoor Environments", IEEE Transactions on Communications, vol. 61, No. 2, Feb. 2013, pp. 1-10.

Sepideh Mohammadi Kouhini, et al., "Li-Fi Using Plastic Optical Fibers (POF) and Distributed MIMO", OSRAM GmbH, 85748, Garching, Germany, Franhofer HHI, 10587 Berlin, Germany, downloaded Oct. 13, 2022, pp. 1-5.

Ki-Hong Park, "On the Power and Offset Allocation for Rate Adaptation of Spatial Multiplexing in Optical Wireless MIMO Channels", IEEE Transactions on Communications, vol. 61, No. 4, Apr. 2013, pp. 1-9.

Kai Ying, "Joint Optimization of Precoder and Equalizer in MIMO VLC Systems", IEEE Journal on Selected Areas in Communications, vol. 33, No. 9, Sep. 2015, pp. 1-10.

* cited by examiner

MULTI-TRANSCEIVER SYSTEM WITH SELECTIVE TRANSMIT BRANCH COMBINATION FOR OPTICAL WIRELESS COMMUNICATION

CROSS-REFERENCE TO PRIOR APPLICATIONS

This application is the U.S. National Phase application under 35 U.S.C. § 371 of International Application No. PCT/EP2021/060218, filed on Apr. 20, 2021, which claims the benefit of European Patent Application No. 20171742.8, filed on Apr. 28, 2020. These applications are hereby incorporated by reference herein.

FIELD OF THE INVENTION

The invention relates to the field of communication in optical wireless networks, such as—but not limited to—LiFi networks, for use in various different applications for home, office, retail, hospitality and industry.

BACKGROUND OF THE INVENTION

Wireless optical networks, such as LiFi networks (named like WiFi networks), enable mobile user devices (called end points (EP) in the following) like laptops, tablets, smartphones or the like to connect wirelessly to the internet. WiFi achieves this using radio frequencies, but LiFi achieves this using the light spectrum which can enable unprecedented data transfer speed and bandwidth. Furthermore, it can be used in areas susceptible to electromagnetic interference. It's important to consider that wireless data is required for more than just our traditional connected devices—today televisions, speakers, headphones, printer's, virtual reality (VR) goggles and even refrigerators use wireless data to connect and perform essential communications. Radio frequency (RF) technology like WiFi is running out of spectrum to support this digital revolution and LiFi can help power the next generation of immersive connectivity.

Based on the modulations, the information in the coded light can be detected using any suitable light sensor. This can be a dedicated photocell (point detector), an array of photocells possibly with a lens, reflector, diffuser of phosphor converter, or a camera comprising an array of photocells (pixels) and a lens for forming an image on the array. E.g., the light sensor may be a dedicated photocell included in a dongle which plugs into the end point, or the sensor may be a general purpose (visible or infrared light) camera of the end point or an infrared detector initially designed for instance for 3D face recognition. Either way this may enable an application running on the end point to receive data via the light.

In wireless optical networks, a physical access device (e.g. transceiver) may typically be located at a luminaire and the logical access point may be connected to one or more physical access devices each located at one or more luminaires. A communication signal can be embedded in a light signal emitted by an illumination source of the physical access device, such as an everyday luminaire, e.g. room lighting or outdoor lighting, thus allowing use of the illumination from the luminaires as a carrier of information. The light thus comprises both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination. A physical access device (e.g. transceiver) may typically be located at a luminaire and the logical access point may be connected to one or more physical access devices each located at one or more luminaires. In many Illumination systems, a contiguous uniform light level is achieved by involving many luminaires and light sources in the same room that all emit light. Thereby, the entire area is illuminated evenly and sharp shadows of obstacles that interrupt the line of light are prevented. Similarly, LiFi systems suffer from immediate link outage if the line of sight (LOS) is blocked, which may happen frequently if a user bends over his communication device and gets in between the ceiling mounted access device (e.g. transceiver) and his own communication device.

The idea of using multiple optical transmitters, that may have multiple overlapping coverage areas from multiple emitters is used here for data transmission. It is not restricted to visible light, it may for instance also be used for Infrared (IR) light or other radiation. The criteria for deployment, in particular as regards the degree of transmitter overlap may therefore be different from that needed for uniform illumination and can for instance be based on the goal of achieving sufficiently homogenous achievable bit rates throughout the coverage area, even when the dominant light beam is accidentally blocked.

Multiple-Input Multiple-Output (MIMO) communication can improve on this situation, as it allows alternative ceiling mounted transceivers that still have a LOS to instantly take over the link. This can even happen at the lowest physical (PHY) layer of the Open Systems Interconnection (OSI) model without protocol level intervention. In fact, it even allows the transmission via multipath links simultaneously, allowing immediately fallback by exploiting another link if one LOS is blocked.

However, a problem with high speed communication is that differences in travel time from different access devices (i.e. light points) can be so substantial that multipath extinctions (nulls) occur through fading in the communication channel. Differences in cable length towards the transceivers may also contribute to these delays. If a client receives a signal half-way underneath two ceiling mounted emitters of access devices, the free space optical path is about equal length, so the signals arrive at almost equal strength. Although the differences in phase due to the free space propagation are small, a difference in cable length of two meters, which corresponds (assuming a cable speed of ⅔ of the speed of light in free space) to a half-wavelength phase difference at 50 MHz is not and may cause nulls. Larger differences in cable length can lead to a first null in the transfer at even lower frequencies. This problem may become worse if future systems use higher bit rates, utilize better emitters (e.g. vertical-cavity surface-emitting lasers (VCSELs) instead of LEDs) and better amplifier at the receivers.

SUMMARY OF THE INVENTION

Optical Wireless Communication as envisaged herein is not limited to the visible light spectrum. Systems are envisaged that may additionally or alternatively make use of the Infrared spectrum and/or the ultraviolet spectrum. Here the infrared spectrum is generally preferred as the energy quanta of infrared have lower energy compared to ultraviolet and thus are more agreeable to areas where users are present. A substantial advantage of using light outside of the visible spectrum is that problems associated with the illumination function, such as flicker, dimming, and having to switch illumination on so as to enable communication only are no longer present.

Even when using light outside of the visible spectrum it may still be beneficial to integrate such OWC systems in illumination devices. One of the key reasons for doing so is location; illumination devices are generally provided in locations that have a direct line-of-sight to where users in need of communication might reside. In addition, it may be possible to tag along to e.g. the existing infrastructure as provided by the illumination light; e.g. power or even connectivity in case of power over ethernet applications.

It is an object of the present invention to provide an optical wireless communication system with an improved robustness against multi-path induced fading.

This object is achieved by an apparatus as claimed in claim 1 or 7, by a modem as claimed in claim 9, by a transceiver as claimed in claim 10, by a system as claimed in claim 12, by a commissioning device as claimed in claim 13, by a method as claimed in claim 14 or 16, and by a computer program product as claimed in claim 17.

According to a first aspect which is directed to a modem or transceiver, an apparatus is provided for controlling an optical wireless communication system, which comprises:
  an input for receiving at least two transmit branch signals for multiple input multiple output, MIMO, communication;
  a combiner for combining the at least two transmit branch signals via a plurality of linear combinations to generate a plurality of output signals to be supplied to respective spatially separated transmitters, wherein the number of output signals is larger than the number of transmit branch signals;
  wherein the combiner is configured to set the linear combinations so that output signals generated from different linear combinations are received in overlapping reception areas of the spatially separated transmitters.

Accordingly, linear combinations used for combining MIMO channel signals to generate transmitter output signals can be selected and updated so that transmitter output signals generated from different linear combinations are received in overlapping reception areas of spatially separated transmitters. Thereby, a MIMO system with multiple transceivers and increased robustness against multi-path fading can be provided. Signals arriving from different transmitters with different delays (e.g. due to different cable lengths) at an endpoint device no longer cancel each other and/or severely reduce bit rates, since the signals now differ from each other.

Thus, a simple MIMO system supporting e.g. two branches, can be enhanced to support more transceivers coupled to the same modem by transmitting different output signals. Installation problems can be mitigated and an option for automatic configuration of the MIMO system (e.g. via a commissioning or learning/training procedure) can be provided.

According to a first option of the first aspect, the combiner may be configured to apply the linear combination by combining the at least two transmit branch signals using selected mixing coefficients. Thereby, the linear combination can be flexibly set and modified by changing respective mixing parameters via software parameters of a digital signal processor or via analog or digital circuits reflecting the mixing parameters.

In this manner a combiner may be provided for combining N transmit branch signals via a plurality of linear combinations by combining the N transmit branch signals using selected mixing coefficients to generate a plurality of M different output signals to be supplied to respective ones of M spatially separated transmitters, wherein M>N. Such a combiner may be configured to set the linear combinations so that output signals generated from different linear combinations are received in overlapping reception areas of the spatially separated transmitters.

Preferably, the combiner is configured to form each one of the M output signals by mixing the N transmit branch signals using N mixing coefficients, the N mixing coefficients of a respective output signal representing a point in an N-dimensional space and wherein the square of the distance to the origin for each of the respective M points is the same, such that the M output signals are output by the M transmitters using the same output signal power. As a result the likelihood of nulling is reduced and the likelihood of receiving different linear combinations in overlapping reception areas of spatially separated transmitters is increased, resulting in a higher likelihood that the N branch signals may be recovered from the received signals.

According to a second option of the first aspect, which may be combined with the first option or with the first aspect, the combiner may be configured to combine two transmit branch signals by using the following matrix of mixing coefficients for a number M of the output signals:

$$\begin{bmatrix} 1 & 0 \\ \cos\left(\frac{\pi}{M}\right) & \sin\left(\frac{\pi}{M}\right) \\ \cos\left(\frac{2\pi}{M}\right) & \sin\left(\frac{2\pi}{M}\right) \\ \cdots & \cdots \\ \cos\left(\frac{\pi(M-1)}{M}\right) & \sin\left(\frac{\pi(M-1)}{M}\right) \end{bmatrix}$$

Thus, a general approach for generating mixing parameters for any number of transceivers can be provided to improve robustness against multi-path fading in dense optical wireless communication networks.

According to a third option of the first aspect, which may be combined with the first or second option or with the first aspect, the combiner may be configured to set the linear combinations by corresponding ratios between feedback resistors and input resistors of operational amplifiers. This measure provides a simple analog implementation of the proposed coefficient-based combination, wherein the mixing coefficients can be readily adjusted by selecting proper resistance values and ratios or using variable resistors.

According to a fourth option of the first aspect, which may be combined with any one of the first to third options or with the first aspect, the combiner may be configured to provide an adaptive setting of the linear combinations by allowing control of switch states of switching elements used for supplying the transmit branch signals to the combiner or for supplying the output signals to the spatially separated transceivers. Using switching elements provides a flexible and easy-to-implement solution for introducing adaptive control in a combiner implemented by an analog or digital circuitry.

According to a fifth option of the first aspect, which may be combined with any one of the first to fourth options or with the first aspect, the apparatus may be configured to allow control of switches states of switching elements based on a learning or training algorithm or based on a commissioning procedure. Thus, an adaptive control of the linear combinations via a feedback mechanism which may be based on a learning or training or commissioning procedure can be provided.

According to a second aspect which is directed to a control device (e.g. a commissioning devices), an apparatus for controlling an optical wireless communication system is provided, which comprises:
- a receiver for receiving from spatially separated transmitters of the optical wireless communication system an information indicating respective selected linear combinations of at least two transmit branch signals for multiple input multiple output, MIMO, communication, wherein the respective selected linear combinations are used to generate based on the at least two transmit branch signals a communication signal transmitted by a respective one of the spatially separated transmitters; and
- a comparator for comparing selected linear combinations received in overlapping reception areas of the spatially separated transmitters and for determining linear combinations that need to be changed so that output signals generated from different linear combinations are received in overlapping reception areas of the spatially separated transmitters.

Thus an apparatus is provided controlling an optical wireless communication system, comprising a receiver for receiving from N spatially separated transmitters of the optical wireless communication system an information indicating respective selected linear combinations of N transmit branch signals, $N \geq 2$, output by an N-output multiple input multiple output, MIMO, modem for communication, wherein the respective selected linear combinations are used to generate based on the N transmit branch signals a communication signal transmitted by a respective one of the spatially separated transmitters; and a comparator for comparing selected linear combinations of the N transmit branch signals in signals received in overlapping reception areas of the spatially separated transmitters and determining linear combinations that need to be changed so that the N transmit branch signals can be generated from the different linear combinations received in overlapping reception areas of the spatially separated transmitters.

According to a first option of the second aspect, the apparatus may be configured to signal a feedback signal with a list of combination states to be updated to the spatially separated transmitters. Thereby, a feedback mechanism for adapting the selected linear combination based on a real reception status can be provided, which also enables a decentralized control of linear combinations for each of the spatially separated transmitters.

According to a third aspect, a modem for generating output signals for multiple input multiple output, MIMO, communication in an optical wireless communication system is provided, wherein the modem comprises an apparatus according to the first aspect.

According to a fourth aspect, a transceiver for transmitting an output signal for multiple input multiple output, MIMO, communication is provided, wherein the transceiver comprises an apparatus according to the first aspect.

According to a first option of the fourth aspect, the transceiver may be configured to transmit an information indicating a linear combination used for generating the output signal to a control device for controlling the setting of the linear combination. Thereby, linear combinations can be checked for individual transceivers by detecting their transmitted linear combination and ensuring that different linear combinations are allocated to neighboring transceiver pairs or transceivers with overlapping coverage or illumination areas.

According to a fifth aspect, an optical wireless communication system is provided, which comprises a modem according to the third aspect and a plurality of spatially separated transceivers according to the fourth aspect.

According to a sixth aspect, a commissioning device is provided for commissioning access points of a wireless optical communication system, wherein the commissioning device comprises an apparatus according to the second aspect.

According to a seventh aspect which is directed to a modem or a transceiver, a method of controlling an optical wireless communication system is provided, which comprises:
- receiving at least two transmit branch signals for multiple input multiple output, MIMO, communication;
- combining the at least two transmit branch signals via a plurality of linear combinations to generate a plurality of output signals to be supplied to respective spatially separated transmitters, wherein the number of output signals is larger than the number of transmit branch signals; and
- setting the linear combinations so that output signals generated from different linear combinations are received in overlapping reception areas of the spatially separated transmitters.

Thus a method of controlling an optical wireless communication system is provided, which comprises: receiving N transmit branch signals, $N \geq 2$, output by an N-output multiple input multiple output, MIMO, modem for communication; combining the N transmit branch signals via a plurality of linear combinations by combining the N transmit branch signals using selected mixing coefficients to generate a plurality of M different output signals to be supplied to respective ones of M spatially separated transmitters, wherein $M>N$; and setting the linear combinations so that output signals generated from different linear combinations are received in overlapping reception areas of the spatially separated transmitters and supplying the M different output signals to M spatially separated transmitters for transmission.

More preferably, the combining comprises forming each one of the M output signals by mixing the N transmit branch signals using N mixing coefficients, the N mixing coefficients of a respective output signal representing a point in an N-dimensional space and wherein the square of the distance to the origin for each of the respective M points is the same, such that the M output signals are output by the M transmitters using the same output signal power.

According to an eighth aspect which is directed to a control or commissioning device, a method of controlling an optical wireless communication system is provided, which comprises:
- receiving from spatially separated transmitters of the optical wireless communication system an information indicating respective selected linear combinations of at least two transmit branch signals for multiple input multiple output, MIMO, communication, wherein the respective selected linear combinations are used to generate based on the at least two transmit branch signals a communication signal transmitted by a respective one of the spatially separated transmitters;

comparing selected linear combinations received in overlapping reception areas of the spatially separated transmitters; and determining linear combinations that need to be changed so that output signals generated from different linear combinations are received in overlapping reception areas of the spatially separated transmitters.

Thus a method of controlling an optical wireless communication system is provided, comprising: receiving from N spatially separated transmitters of the optical wireless communication system an information indicating respective selected linear combinations of N transmit branch signals, N≥2, output by an N-output multiple input multiple output, MIMO, modem for communication, wherein the respective selected linear combinations are used to generate based on the N transmit branch signals a communication signal transmitted by a respective one of the N spatially separated transmitters; comparing selected linear combinations of the N transmit branch signals in signals received in overlapping reception areas of the spatially separated transmitters; and determining linear combinations that need to be changed so that the N transmit branch signals may be generated from the different linear combinations received in overlapping reception areas of the spatially separated transmitters.

According to a ninth aspect, a computer program product may be provided, which comprises code means for producing the steps of the above methods of the seventh or eighth aspect when run on a computer device.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatus of claim 1 or 7, the modem of claim 9, the transceiver of claim 10, the system of claim 12, the commissioning device of claim 13, the method of claim 14 or 16, and the computer program product of claim 17 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 1 shows schematically a block diagram of a LiFi architecture in which various embodiments can be implemented;

FIG. 2 shows schematically a LiFi architecture for multiple input and multiple or single output communication;

FIG. 3 shows schematically a frequency diagram of signal and noise power spectral densities at an input amplifier of a two-ray receiver;

FIG. 4 shows schematically a block diagram of an optical transmission system with transmit branch combination according to various embodiments;

FIG. 5 shows schematically a two-dimensional coordinate system with mixing coefficients for two input channels of different transmit branch combinations according to various embodiments;

FIG. 6 shows schematically a block diagram of a multi-transceiver access device with fixed setting of combinations according to various embodiments;

FIG. 7 shows schematically a block diagram of a first example of a multi-transceiver access device with adaptive setting of combinations according to various embodiments;

FIG. 8 shows schematically a block diagram of a second example of a multi-transceiver access device with adaptive setting of combinations according to various embodiments;

FIG. 9 shows a flow diagram of a commissioning-based combination setting procedure at a multi-transceiver access device according to various embodiments;

FIG. 10 shows schematically a block diagram of a commissioning device for adaptive setting of combinations according to various embodiments;

FIG. 11 shows a flow diagram of a commissioning-based combination setting procedure at a commissioning device according to various embodiments;

FIG. 12 shows schematically an architecture of a commissioning system for adaptive setting of combinations at a multi-transceiver access device according to various embodiments;

FIG. 13 shows schematically an exemplary arrangement of transceivers and combination states; and FIG. 14 shows schematically an exemplary implementation of a multi-transceiver access device with transmit branch combination according to various embodiments.

DETAILED DESCRIPTION OF EMBODIMENTS

Various embodiments of the present invention are now described based on an optical wireless illumination and communication (LiFi) system with multi-transceiver access device.

Throughout the following, a luminaire as an access device is to be understood as any type of lighting unit or lighting fixture which comprises one or more light sources (including visible or non-visible (infrared (IR) or ultraviolet (UV)) light sources) for illumination and/or communication purposes and optionally other internal and/or external parts necessary for proper operation of the lighting, e.g., to distribute the light, to position and protect the light sources and ballast (where applicable), and to connect the luminaires to a power supply. Luminaires can be of the traditional type, such as a recessed or surface-mounted incandescent, fluorescent or other electric-discharge luminaires. Luminaires can also be of the non-traditional type, such as fiber optics with the light source at one location and the fiber core or "light pipe" at another.

It is further noted that when using optical wireless communication based on invisible parts of the light spectrum, such as infrared and/or or ultraviolet, the apparatus in accordance with the claimed invention may also be embedded in a separate transceiver node of the optical wireless communication system.

Figure 1:
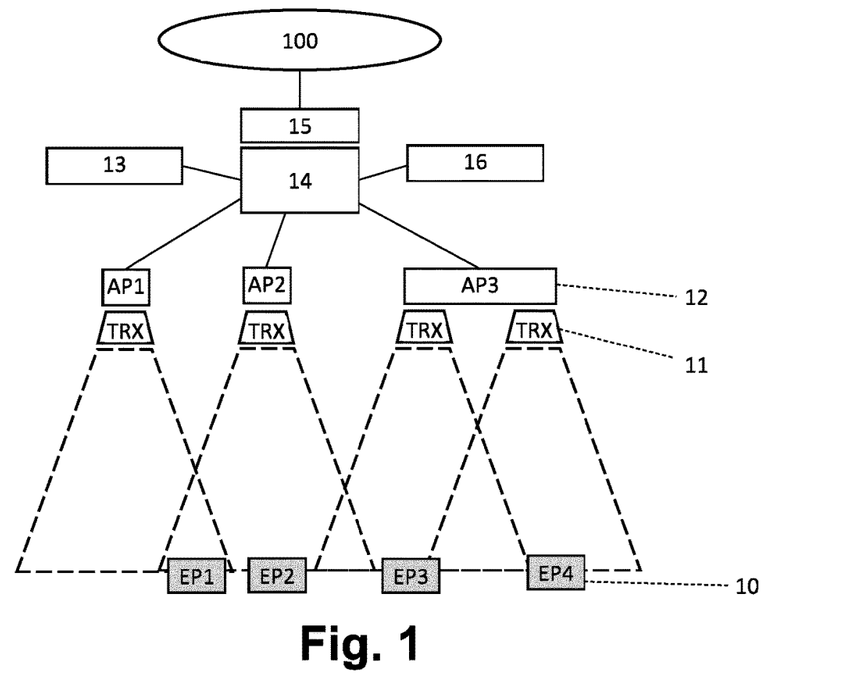

FIG. 1 shows schematically a block diagram of a LiFi network in which various embodiments can be implemented.

The LiFi network comprises multiple access-points (APs) AP1 to AP3 12, e.g. luminaires of a lighting system, connected via a switch (e.g. an Ethernet switch) 14, whereby each AP 12 controls one, or multiple transceivers (TRX) 11 (i.e. combined transmitters (optical emitters) and receivers (light sensors)) for optical communication towards end points (EP) EP1 to EP4 10, e.g., mobile user devices or other user devices. Respective light beams generated by the TRXs 11 and defining coverage areas on the plane(s) of the EPs 10 are indicated by the dashed trapezoids in FIG. 1.

An AP 12 may apply a time-slot schedule for communicating with EP(s) 10 in its coverage area. Where the coverage areas of the TRXs 11 overlap (as shown for EP1 in FIG. 1), coordination of APs 12 is needed if the related TRXs 11 belong to different APs 12 in order to reduce cross-AP interference.

A LiFi controller 13 configured to manage the LiFi network is connected to the switch 14 and can provide such coordination for supporting interference handling and handover when one of the EPs 10 moves into and out of overlapping coverage areas of the APs 12. The controller 13 is connected via the switch 14 to the APs 12. The switch 13 may be connected to a synchronization server 16 for synchronization management and to a router for connecting to a backplane or backhaul network (e.g. Ethernet) 100.

Figure 2:
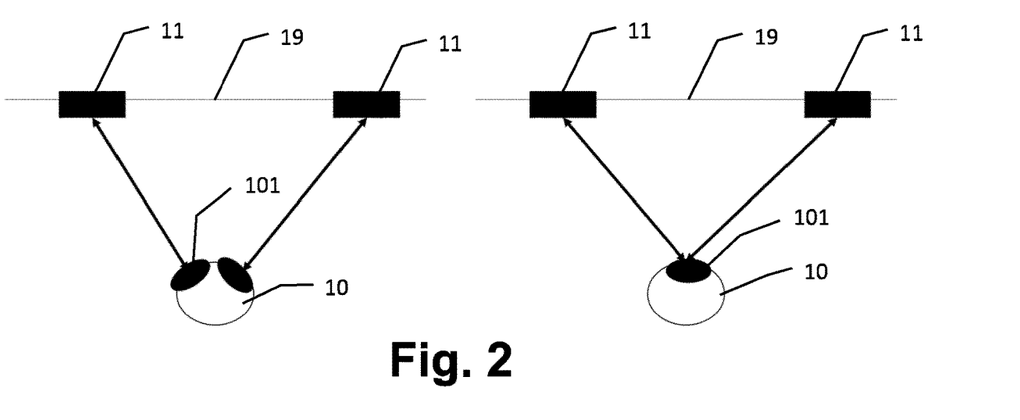

FIG. 2 shows schematically two options for MIMO communication in a LiFi infrastructure.

The LiFi infrastructure comprises a plurality of TRXs 11 of respective APs (e.g. luminaires of a lighting system) located in a planar area 19 (e.g. a ceiling wall in a building). Each of the TRXs 22 has an optical coverage area for transmitting and receiving LiFi signals projected on a second planar area (not shown, e.g. a ground floor of a building), on which an EP 10 with an optical frontend 101 for receiving optical LiFi signals emitted by the TRXs is located.

The left system in FIG. 1 is a MIMO system where the same LiFi signal is exchanged between at least two different TRXs 11 of respective ceiling APs and at least two different optical frontends 101 of the EP 10.

A simplified version shown in the right portion of FIG. 2 is a multiple input single output (MISO) system, in which multiple (at least two) TRXs 11 of respective ceiling APs communicate with a single optical frontend 101 at an EP 10 that receives multiple signals from the multiple TRXs 11.

MISO operation allows the standard optical frontend 101 (e.g. dongle) of the EP 10 to benefit from the processing in the TRXs 11 at the ceiling. The respective transmit branches of the two or more TRXs 11 can be used by the single EP 10 to create a single common signal, the present invention may be used to compensate for delays and phase differences. A MIMO-capable modem of the AP at the ceiling can actively estimate both downlink channels separately. This may ensure that—e.g. per frequency bin of orthogonal frequency-division multiplexing (OFDM)—the phases are adjusted to ensure coherent constructive addition and to eliminate multipath fading (e.g. nulling).

In most situations, it may be sufficient if only one or two light rays of LiFi signals really contributes significantly to the reception. That means that it may be sufficient that a MIMO-capable modem is used for a MISO transmission, where two optical emitters of respective TRXs transmit to one optical receiver at an EP.

This can be quite be effective if the optical receiver is at a cross point of two optical emitters so that the optical path lengths of both transmission links are almost identical and the amplitudes are the same. However, a remaining phase difference of $\exp\{-2\pi j \tau f\}$ may still be introduced by a difference in the feeding cable length of the two (or more) TRXs, wherein $\tau$ denotes the time delay caused by the difference in the cable length and f denotes the frequency of the LiFi signal. As the optical receiver at the EP adds the two signals with equal strength, a full extinction or cancellation (null) is caused at a frequency where $\tau f$ is =½ or odd multiples thereof.

As an example, if cable lengths between the modem and the TRXs differ by more than e.g. 2 m, a receiver in the middle between to TRXs received two signals with a delay that leads to cancellations over a wide part of the spectrum. In a MISO system, the modem can be operated that the phase of one TRX is flipped automatically at the concerned frequency range to prevent the cancellation. Outside the concerned frequency range, a most suitable phase is chosen, so that the bandwidth near the notches due to the cancellation can still be used.

Figure 3:
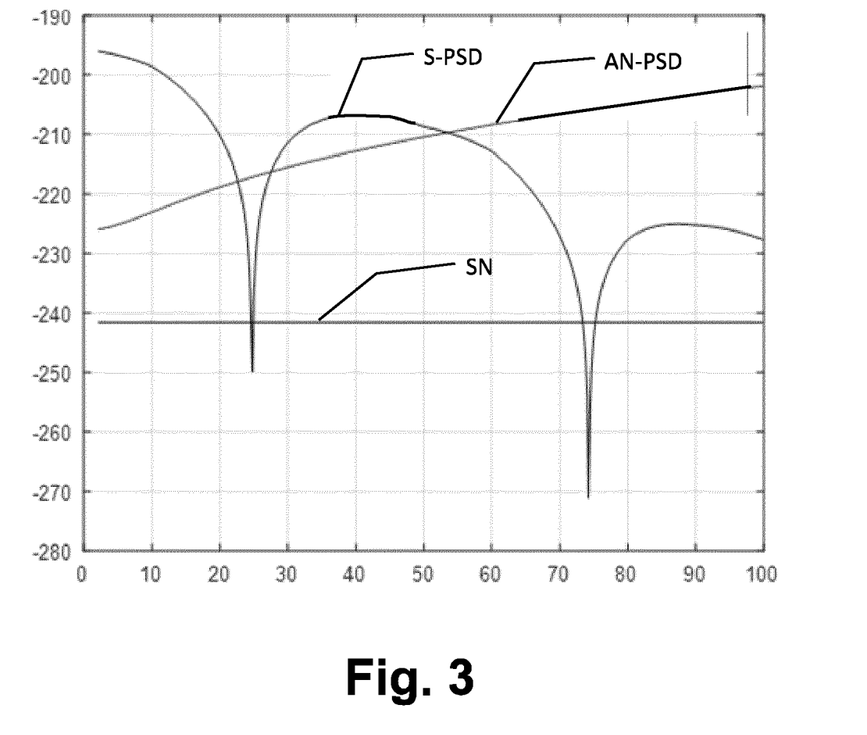

FIG. 3 shows schematically a frequency diagram of signal and noise power spectral densities at an input amplifier of a two-ray receiver.

More specifically, the frequency diagram of FIG. 3 shows characteristics of power spectral densities (PSDs) of a MISO LiFi signal (S-PSD), an amplifier noise signal (AN-PSD) and a shot noise signal (SN) generated as a cause of direct current (DC) of a photo current and darkness current at a photo detector element at the receiver of the EP. As can be gathered from the frequency diagram, notches due to multipath cancellation effects (fading) are observed at about 25 MHz and 75 MHz. The notch at 25 MHz makes the channel less suited for data communication between 15 and 35 MHz.

According to various embodiments, a plurality of transmit branch signals at the output of a modulator are combined by using selected mixing coefficients to increase robustness against multi-path fading effects.

Figure 4:
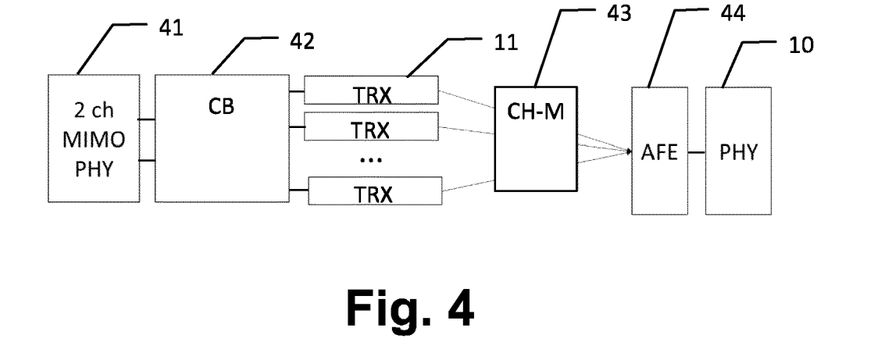

FIG. 4 shows schematically a block diagram of an optical transmission system with transmit branch combination according to various embodiments.

The proposed system allows the use of two or more optical outlets (i.e. TRXs), wherein a combiner function or circuit (CB) 42 (called "combiner" in the following) is added to provide a fixed or adaptive linear combination of transmit branch signals using the selected mixing coefficients.

Accordingly, the proposed optical wireless communication system (e.g. LiFi system) comprises a physical layer (PHY) signal processing communication unit (e.g. MIMO modem) 41 (called "MIMO modem" in the following) adapted to generate a MIMO signal with N transmit branches (N larger than or equal 2). The N transmit branch terminals of the signal processing communication unit 41 are connected to the combiner 42 which combines the N transmit branches by using a plurality of mixing coefficients to generate M output signals (M larger than or equal N) supplied to M optical transmitter units (emitters) of respective TRXs 11.

The combiner 42 connects the N transmit branches to the M transmitters of the TRXs 11 and may be composed of linear combinations of the N transmit branches, wherein mixing coefficients of the linear combination are selected to reduce the likelihood of cancellation (nulling) of optical signals transmitted through the wireless space defined by a channel matrix 43 and received at a receiver through an analog frontend (AFE) 44 (comprising e.g. channel filters, amplifiers, attenuators, mixers etc.) followed by a physical layer (PHY) unit 10 (handling e.g. addressing, collision avoidance, data acknowledgment protocols etc.).

As explained in the following examples of FIGS. 6 to 8, the parameter-based combination operation of the combiner 42 can be fixed or adaptive (e.g. based on a learning algorithm or based on (historic) input from users to find out which TRXs are neighbors).

A simple first example of mixing coefficients for two MIMO transmit branches or channels or paths (N=2) and two TRXs (M=2) may be to just connect the first MIMO transmit branch to the first TRX and the second MIMO transmit branch to the second TRX. In this case, the parameter matrix for combining the two MIMO transmit branches to obtain the input signals of the two TRXs could be expressed as follows:

$$\begin{bmatrix} 1 & 0 \\ 0 & 1 \end{bmatrix}$$

but also a good choice could be the following second example:

$$A \frac{\sqrt{2}}{2} \begin{bmatrix} 1 & 1 \\ 1 & -1 \end{bmatrix}$$

which means that the input signal of the first TRX corresponds to the sum of the two transmit branch signals each multiplied by a mixing coefficient $$A \frac{\sqrt{2}}{2}$$

and the input signal of the second TRX corresponds to the difference between the two transmit branch signals each multiplied by a mixing coefficient $$A \frac{\sqrt{2}}{2}.$$

According to a third example for two MIMO transmit branches and four TRXs, the mixing coefficients could for example be selected as follows:

$$\begin{bmatrix} 1 & 0 \\ 0 & 1 \\ \frac{\sqrt{2}}{2} & \frac{\sqrt{2}}{2} \\ \frac{\sqrt{2}}{2} & -\frac{\sqrt{2}}{2} \end{bmatrix}$$

which means that the input signal of the first TRX corresponds to the first transmit branch signal, the input signal of the second TRX corresponds to the second transmit branch signal, the input signal of the third TRX corresponds to the sum of the first and second transmit branch signals each multiplied by a mixing coefficient $$\frac{\sqrt{2}}{2},$$

and the input signal of the fourth TRX corresponds to the difference between the first and second transmit branch signals each multiplied by a mixing coefficient parameter $$\frac{\sqrt{2}}{2}.$$

More generally, for N MIMO transmit branches and M transceivers, and an N-dimensional space. The coordinates of each point in the N-dimensional space represent the N mixing coefficients of the respective signal combination and the square of the distance to the origin represents signal power.

In this manner a combiner may be configured to form each one of the M transmitter/transceiver output signals by mixing the N transmit branch signals of the modem using N mixing coefficients. The N mixing coefficients of a respective output signal can be considered to represent a point in an N-dimensional space, where the square of the distance to the origin for each of the respective M points in the N dimensional space is the same. As a result each of the N transmit branch signals (having the same power) may contribute a fraction of power, based on the applicable coefficient, to the M output signal's signal power. By setting the distance to the origin equal for all M output signals, the M transmitters will transmit the same output signal power.

The respective M points in the N dimensional space, represent points on the real part of an N-sphere. For N=2 this translates to the real circle half of the unity circle. Without a priori knowledge of the receivers, preferably the points on the real circle half would be spaced apart as much as possible, so as to facilitate the reconstruction at the receiver. Using this approach it is possible to decode N transmit branch signals in areas where N of the M output signals are received. As the likelihood of transmit branch signals cancelling is reduced, this improves robustness of transmitter systems to delays e.g. from cable lengths of different optical transmitters.

Figure 5:
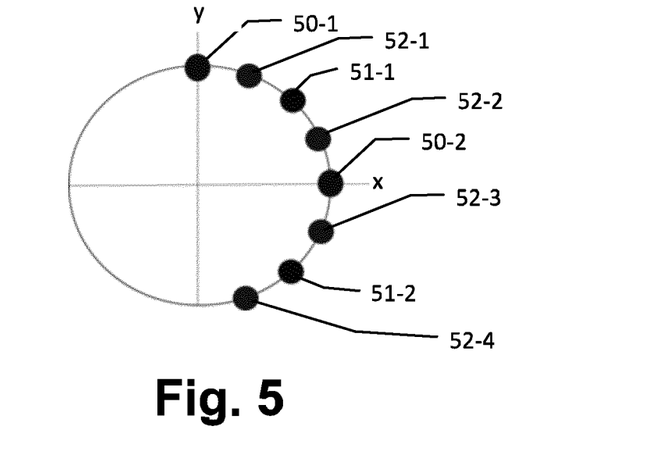

FIG. 5 shows schematically a two-dimensional coordinate system with coordinates x and y each representing one of the two transmit branch signals output by the MIMO modem with mixing coefficients of different transmit branch combinations according to various embodiments.

The two coordinate points 50-1 and 50-2 on the x and y axis, respectively, correspond to the above first example with two TRXs.

Furthermore, the four coordinate points 50-1, 50-2, 51-1 and 51-2 correspond to the above third example with four TRXs.

Additionally, the eight coordinate points 50-1, 50-2, 51-1, 51-2, 52-1, 52-2, 52-3 and 52-4 correspond to a case with eight TRXs.

As a general example for two transmit branches and M output signals (i.e. M TRXs), an M-dimensional sphere can be drawn around the origin of the coordinate system. Then, only positive parameter of the x-axis are considered and the following matrix of mixing coefficients can be obtained:

$$\begin{bmatrix} 1 & 0 \\ \cos\left(\frac{\pi}{M}\right) & \sin\left(\frac{\pi}{M}\right) \\ \cos\left(\frac{2\pi}{M}\right) & \sin\left(\frac{2\pi}{M}\right) \\ \ldots & \ldots \\ \cos\left(\frac{\pi(M-1)}{M}\right) & \sin\left(\frac{\pi(M-1)}{M}\right) \end{bmatrix}$$

The above parameter-based combination can be implemented by providing resistances proportional to the inverse of the matrix parameter values in the forward path of the combiner 42. If values are negative, the resistor is connected to the inverted signal which can be obtained by adding an inverter circuit.

Figure 6:
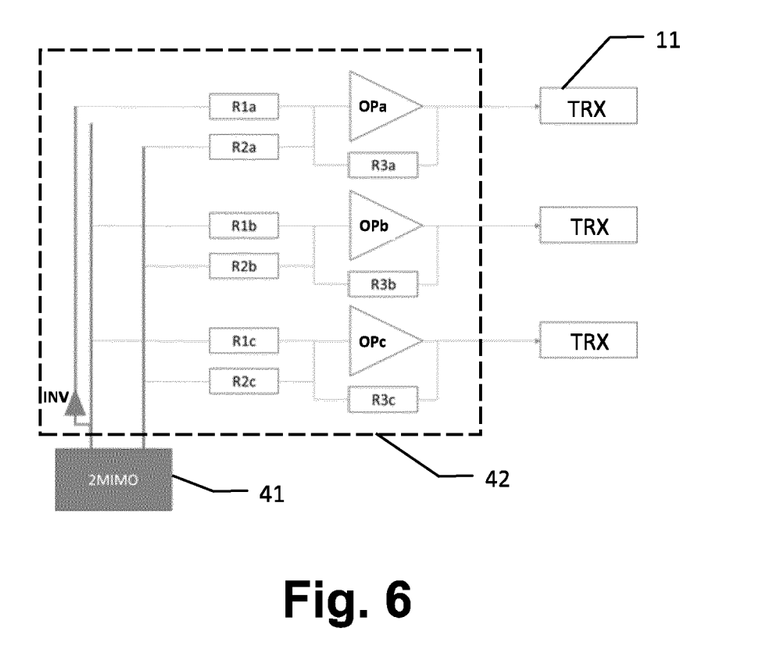

FIG. 6 shows schematically a block diagram of a multi-transceiver access device with a fixed setting of combinations according to various embodiments.

It is noted that—throughout the present disclosure—the structure and/or function of blocks with identical reference numbers that have been described before are not described again, unless an additional specific functionality is involved.

The multi-transceiver access device of FIG. 6 comprises a MIMO modem 41 with two transmit branches or channels X and Y, a combiner 42 for combining the two transmit branches by using fixed mixing coefficients to generate three output signals supplied to three TRXs 11.

The mixing coefficient are defined by the ratios between respective feedback resistors R3a, R3b and R3c and respective input resistors R1a, R2a, R1b, R2b, R1c and R2c of respective operational amplifiers OPa, OPb and OPc, which define respective amplification factors or gains g1a, g2a, g1b, g2b, g1c and g2c of the respective operational amplifiers OPa to OPc as mixing coefficient, as follows:

$$g1a=-R3a/R1a$$

$$g2a=-R3a/R2a$$

$$g1b=-R3b/R1b$$

$$g2b=-R3b/R2b$$

$$g1c=-R3c/R1c$$

$$g2c=-R3c/R2c$$

Due to the fact that the first transmit branch signal X (left output in FIG. 6) of the MIMO modem 41 is routed to the input of the upper operational amplifier OPa via an inverter circuit INV, the sign of mixing coefficient of this transmit branch for the upper TRX 11 in FIG. 6 is inverted to g1a=+R3a/R1a.

Therefore, the three output signals Oa to Oc of the TRXs are obtained by the following combinations of transmit branches X and Y with respective mixing parameters are:

Upper *TRX* 11: $Oa=(R3a/R1a)X-(R3a/R2a)Y$

Middle *TRX* 11: $Ob=-(R3b/R1b)X-(R3b/R2b)Y$

Lower *TRX* 11: $Ob=-(R3c/R1c)X-(R3c/R2c)Y$

In the following, examples of an adaptive and/or self-learning approach of the combiner 42 are described based on FIGS. 7 and 8.

Figure 7:
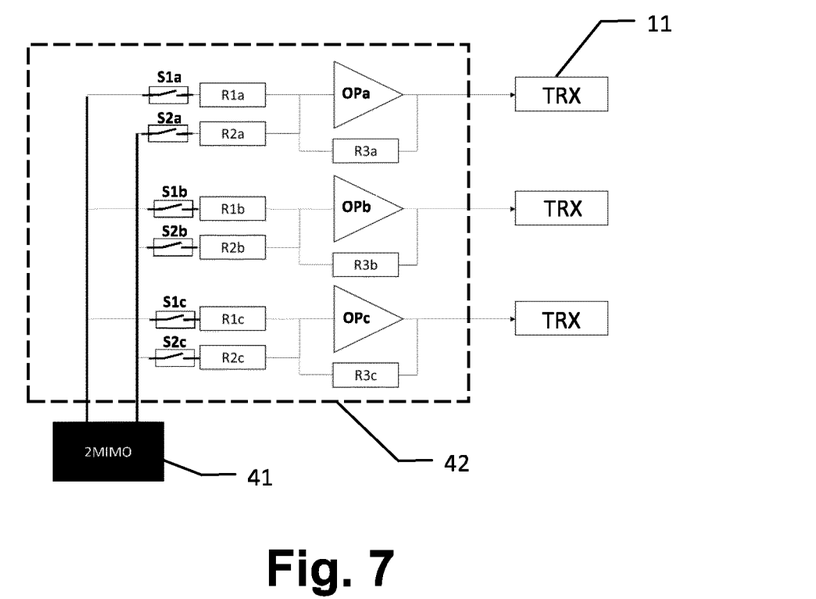

FIG. 7 shows schematically a block diagram of a first example of a multi-transceiver access device with adaptive setting of combinations according to various embodiments.

The configuration of the adaptive combiner 42 of FIG. 7 basically corresponds to the example of FIG. 6 with the exception that the inverter circuit INV has been omitted and each of the transmit branch signals X and Y is connected to the respective one of the input resistors R1a, R2a, R1b, R2b, R1c and R2c via a respective one of switching elements S1a, S2a, S1b, S2b, S1c and S2c which may be implemented as semiconductor switches (e.g. transistors) or mechanical (micro) switches or the like.

The switches states of the switches S1a, S2a, S1b, S2b, S1c and S2c may be controlled via respective control signals which may be generated e.g. by an adaptive setting mechanism or algorithm based on a feedback from at least one receiver of at least one respective EP or a commissioning device. The modem 41 generates the two transmit branch signals X and Y and a suitable combination of the two transmit branch signals X and Y is selected by or for each of each of the TRXs 11.

Figure 8:
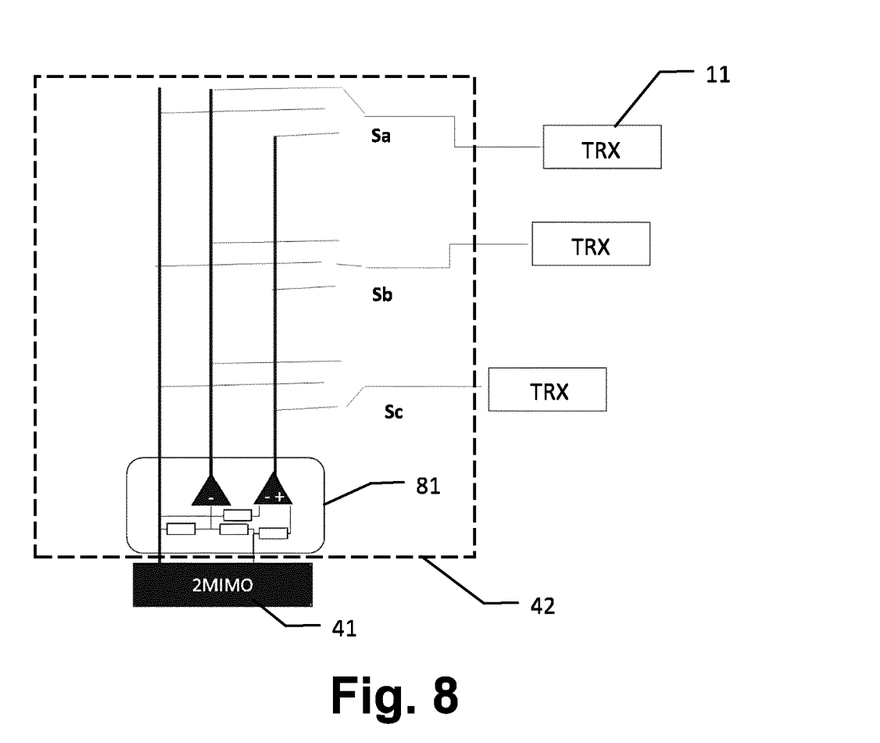

FIG. 8 shows schematically a block diagram of a second example of a multi-transceiver access device with adaptive setting of combinations according to various embodiments. In the second example, the two transmit branch signals X and Y of the modem 41 are first combined in the combiner 42 by an amplifier-resistor circuit 81 with respective mixing coefficients defined by a resistor network to generate three output signals for the three TRXs 11 which are then selectively applied to respective input terminals of the TRXs 11 via respective switching elements Sa, Sb and Sc which may be implemented as semiconductor switches (e.g. transistors) or mechanical (micro) switches or the like.

According to FIG. 8, the first transmit branch signal X (left output of the modem 41) can be directly applied to each of the three TRXs 11 if the switching elements Sa to Sc are controlled to select the middle one of their three input terminals. The upper and lower ones of their input terminals are connected to respective output signals generated by specific combinations of the transmit branch signals X and Y, as defined by the amplifier-resistor circuit 81.

In the above first and second examples of the adaptive combination in the combiner 42, the connecting states of the switching elements can be controlled based on a learning or training algorithm to ensure that TRXs of neighboring lamps or luminaires of access points receive different communication signals (i.e. output signals Oa to Oc). In a regular rectangular pattern of TRXs e.g. at the ceiling, two different MIMO signals are sufficient to ensure that neighboring TRXs never receive the same signal.

To train the system every TRX 11 could be informed about or determine a suitable combination of transmit branches for its emission. The goal may be to ensure that neighboring TRXs (in respective lamps or luminaires) receive different signals (e.g. different phase and/or amplitude).

The proposed enhanced network infrastructure can be kept simple, if the adaptive feedback functionality is implemented without a central controller. In other words, the adaptive combination of the transmit branch signals X and Y for the TRXs 11 should be controlled locally.

The adaption and/or initial configuration of the combinations at the combiner 42 can be achieved by a commissioning procedure. For the required communication in connection with the commissioning procedure, out-of-band (OOB) signaling may be used, as it can be implemented in the TRXs 11 without adding extra light emitting diodes (LED's) and photodetectors. The OOB signaling is conveyed outside a defined frequency band of the LiFi communication signals, or, metaphorically, outside some other kind of signaling activity of the LiFi network.

Figure 9:
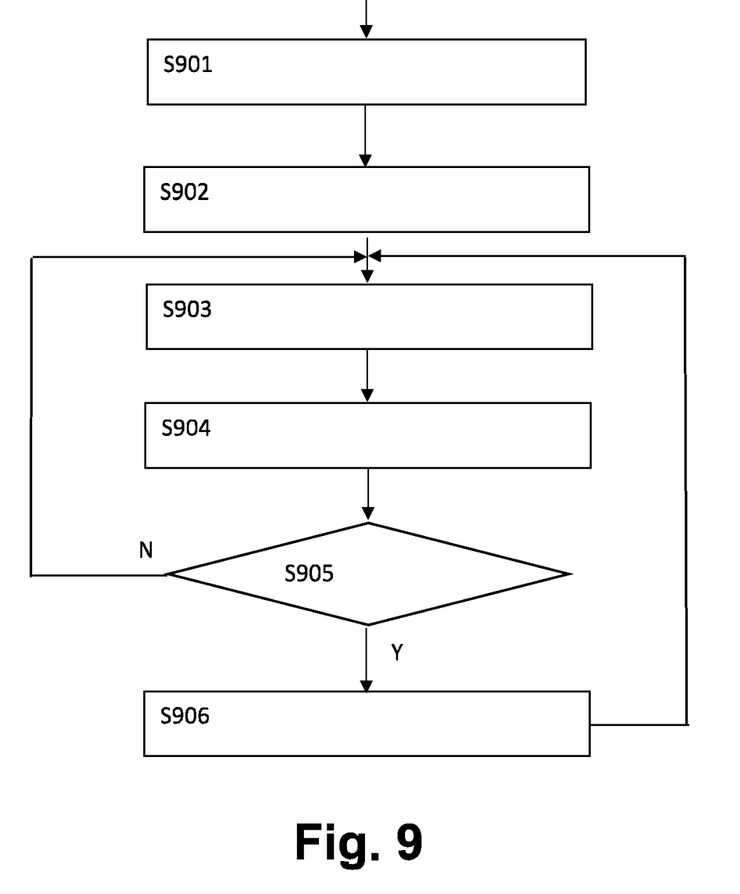

FIG. 9 shows a flow diagram of a commissioning-based combination setting procedure at a multi-transceiver access device according to various embodiments.

In an initial step S901, N MIMO transmit branch signals (e.g. X and Y) are received from the modem 41. Then, in step S902, an initial or default setting of combinations and their respective mixing coefficients of the combiner 42 is selected and M corresponding output signals are forwarded to the TRXs 11. In the subsequent step S903, an information about the selected individual combination (combination state) are transmitted together with an identifier (ID) of each TRX 11 of the access device (e.g. via OOB signaling) to a commissioning device which may be a mobile device that scans the LiFi communication range based on an automatic or manual operation.

Then, in step S904, the access device waits until it has received a feedback message from the commissioning device, which indicates whether the selected combination of the identified TRX can be kept or needs to be updated, e.g., due to a collision with a neighboring TRX using the same or a not sufficiently discriminated combination of the transmit branches.

In the following step S905, the access device checks whether the selected combination must be updated. If not, the procedure jumps back to step S903 and continues with the transmission of the present combination and the ID of the respective TRX, e.g., in response to a trigger received from the commissioning device. If a required update of the selected combination has been received from the commissioning device, the procedure continues with step S906 where a new combination is set up (e.g. by a corresponding control signals applied to the switching elements of the combiner 42) based on a respective information received from the commissioning device or based on an arbitrary or predetermined own selection of a new combination.

Figure 10:
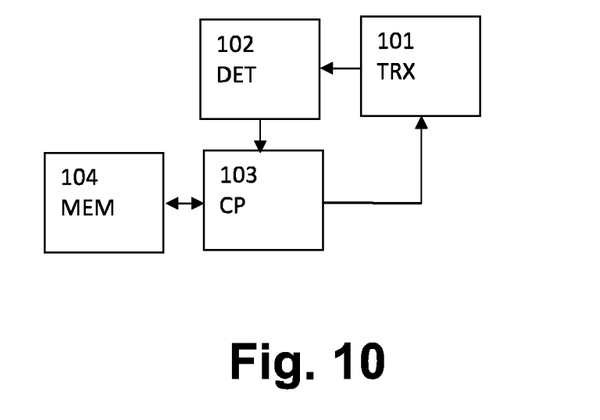

FIG. 10 shows schematically a block diagram of the commissioning device for adaptive setting of combinations according to various embodiments.

The commissioning device may be a mobile user device with a TRX 101 for the commissioning signaling (e.g. OOB signaling). The OOB signaling may be an optical frequency range or an RF range.

A detector circuit (DET) 102 is configured to detect the combination state and ID signaled via the OOB signaling from respective access devices arranged e.g. at the ceiling of a building and forwards the received ID(s) and the combination state(s) to a comparator (CP) 103 which stores a list of received IDs and respective combination states e.g. together with a geographical information about the geographical relation between the respective TRXs identified by the received IDs in a memory or database (MEM) 104. This geographical information may simply indicate (e.g. by a neighbor flag or the like) which of the combination states belong to neighboring TRXs.

If the comparator 103 determines that two neighboring TRXs have identical or not sufficiently discriminative combination states, it initiates transmission of a feedback signal to the access device of the respective TRX via the own TRX 101 with an indication that the combination state of the respective TRX needs to be updated. As an additional option, the comparator 103 may be configured to select a sufficiently discriminative combination state for the concerned TRX and initiate transmission of the selected combination state to the concerned TRX.

Figure 11:
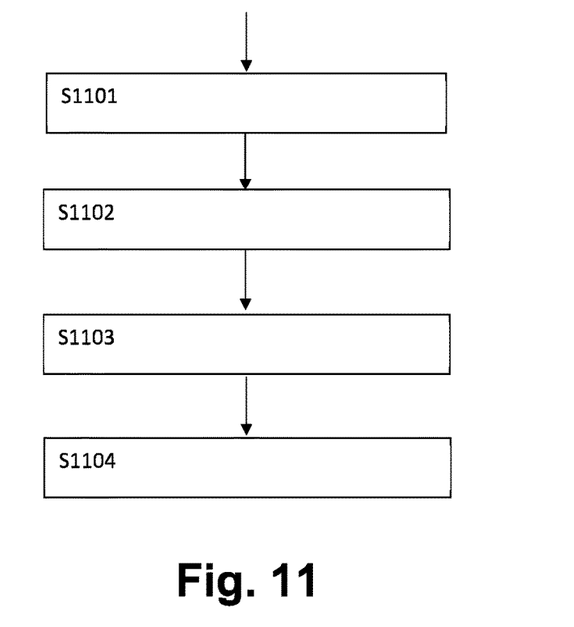

FIG. 11 shows a flow diagram of a commissioning-based combination setting procedure at a commissioning device according to various embodiments.

In an initial step S1101, the commissioning device receives an information about selected combination state(s) together with respective ID(s) of each TRX 11 within a scanned communication range (e.g. via OOB signaling) from respective access devices located in a scanning range of the commissioning device (which may be a mobile device that scans the LiFi communication range based on an automatic or manual operation).

Then, in step S1102, the commissioning device stores the received combination state(s) together with their respective ID(s) and an optional geographical information that may indicate a neighboring state of respective TRXs (e.g. in a database or memory of the commissioning device). Based thereon, a log or list of all (neighboring) TRX pairs that can be used for MIMO or MISO reception at an EP may be generated. In a manual scanning mode, the log could be generated while a user of the commissioning device walks through a room until messages from all TRXs have been received. In an automatic scanning mode, the reception range (e.g. antenna characteristics) of a receiver at the commissioning device could be mechanically or electronically controlled to scan through the whole area where all TRXs are located.

Then, in step S1103, it is determined which of the received combination states need to be updated (e.g. due to a collision at a related TRX pair) and a corresponding list may be generated. As an optional measure, an updated combination state could be selected for each TRX on the generated list.

Finally, in step S1104, a feedback signal with the corresponding list of combination states to be updated and respective ID may be signaled (e.g. via OOB signaling) to the access device together with the optional suggestions of new combination states.

Figure 12:
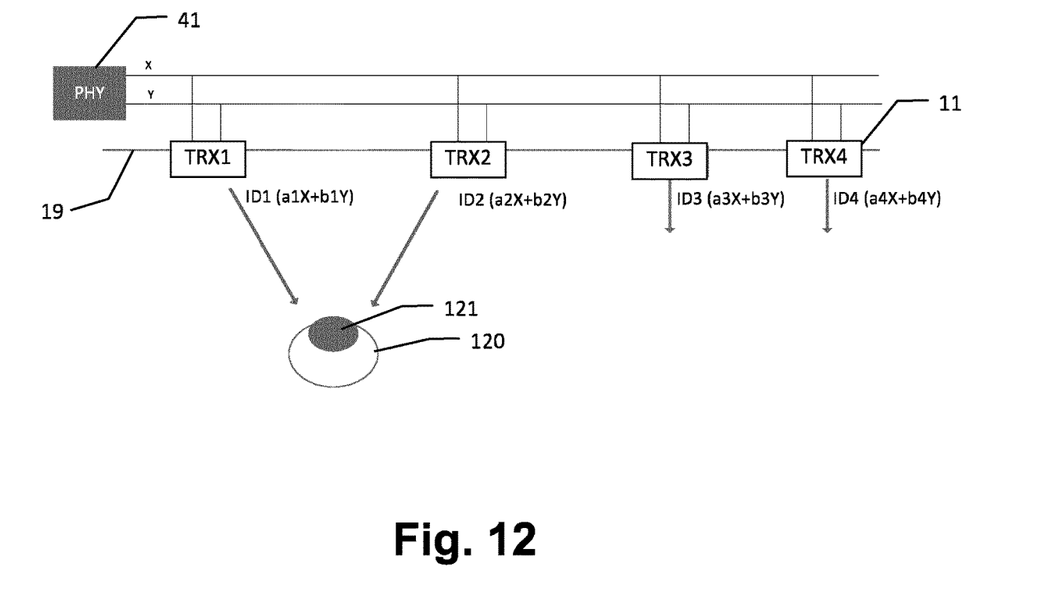

FIG. 12 shows schematically an architecture of a commissioning system for adaptive setting of mixing coefficients at a multi-transceiver access device according to various embodiments.

In the system of FIG. 12, a MIMO modem 41 generates two transmit branch signals X and Y supplied to four TRXs 11 (TRX1 to TRX4) comprise respective combiners (not shown) which combine the two transmit branch signals X and Y as follows:

TRX1: $a1X+b1Y$ (identified by ID1);
TRX2: $a2X+b2Y$ (identified by ID2);
TRX3: $a3X+b3Y$ (identified by ID3); and
TRX4: $a4X+b4Y$ (identified by ID4).

As an example, the selection at the respective combiners of the TRXs can be achieved by at least one controllable wave-length selective filter inserted in the signal path of the transmit branch signals.

Via OOB signaling every TRX 11 communicates (e.g. broadcasts) its ID and selected X-Y combination towards a commissioning device 120 with a receiver 121. To ensure that the commissioning device 120 receives messages from all TRXs 11 in its communication range, a random back-off time could be used for the transmission.

Figure 13:
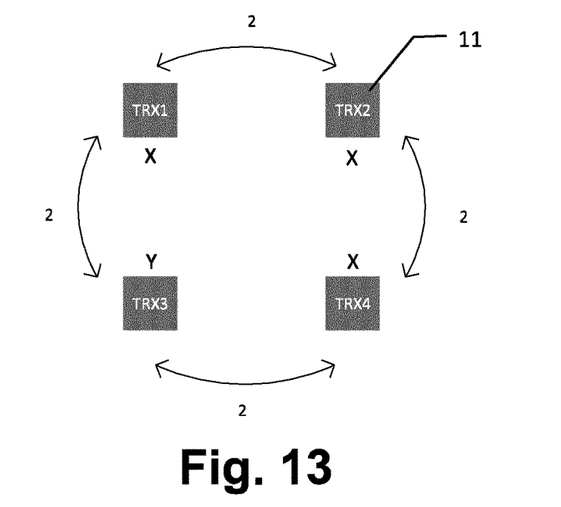

FIG. 13 shows schematically an exemplary arrangement of transceivers and their respective selected combination states.

In the example of FIG. 13, four TRXs 11 (TRX1 to TRX4) are arranged in a square pattern e.g. on a ceiling of a room. The respective TRX pairs of the log may thus be TRX1/TRX2, TRX1/TRX3, TRX2/TRX4 and TRX3/TRX2, as indicated by the double-sided arrows between the respective TRXs 11. As indicated in FIG. 13, TRX1, TRX2 and TRX4 have signaled a combination state "X" (which indicates e.g. a first transmit branch of the MIMO modem) while TRX4 has signaled a combination state "Y" (which indicates e.g. a second transmit branch of the MIMO modem). When the log is complete, the commissioning device is now able to define a list of transceivers which should update its selection.

In the example shown in FIG. 13, TRX2 should switch to the combination state "Y" to make sure that all identified pairs of neighboring TRXs transmit their respective optical communication signals with mutually different combination states "X" and "Y", respectively. This result is communicated back by the commission device communicates in a feedback signal transmitted via the 00B channel.

Figure 14:
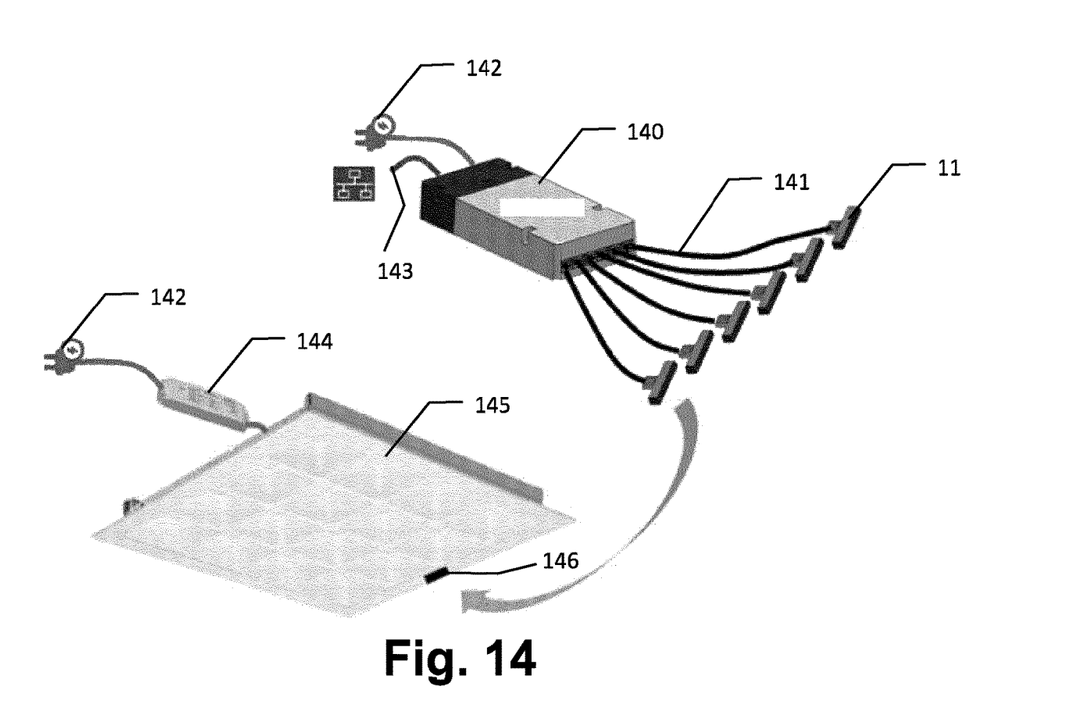

FIG. 14 shows schematically an exemplary implementation of a multi-transceiver access device with transmit branch combination according to various embodiments.

In the exemplary implementation of FIG. 14, a MIMO modem 140 is connected via plug 142 to a mains power grid and via a network cable 143 to a communication network (e.g. a local area network (LAN) or the like). The MIMO modem 140 comprises a combiner (not shown) as explained in the above embodiments and generates six output signals with respective different combination states based on e.g. two transmit branch signals generated by the MIMO modem. The six output signals are supplied via respective cables 141 to six TRXs 11 (e.g. infrared (IR) transceivers) with integrated plugs or interfaces that can be connected to a corresponding sockets 146 provided at respective ceiling units (panels) 145 which comprises one or more lamps or luminaires for optical transmission of the output signal generated by a respective TRX 11. The ceiling unit 145 is driven by a driver circuit 144 (e.g. an LED driver) which is connected via another plug 142 to the mains power grid.

In this manner the optical wireless TRX units are integrated in the ceiling units and do not require separate transmitter units. Alternatively; e.g. in the event the spacing of the illumination ceiling units is too far apart to provide proper coverage by means of TRXs integrated in ceiling units; a TRX could be mounted in a separate "standalone" unit (not shown).

The cable length between the access device 140 and all ceiling units 145 should preferably be identical to minimize phase delays between output signals of different TRXs 11.

The exemplary implementation of FIG. 14 can be used to enhance MIMO capabilities by increasing the number of transmit branch signals (e.g. two outlets) generated by the MIMO modem to more output signals with mutually different combinations for a plurality of the ceiling units 145 (e.g. six or twelve units).

According to various embodiments, the reverse communication direction (i.e. uplink direction) may be considered as well. A communication system that uses any of the aspects of the above embodiments in the downlink direction from infrastructure devices (typically ceiling or wall mounted TRXs 11 of access points 12) towards distributed endpoints 10 may complement this with an uplink communication link back from the endpoints 10 to the infrastructure devices. This may be achieved by having at least some of the endpoints 10 emit at least one uplink radiation beam carrying data signals that are receivable by uplink signal detectors or receivers at at least some of the infrastructure devices located e.g. at the ceiling or a wall of a building. The infrastructure devices may then combine data signals received by the uplink signal receivers to optimize combination procedures of downlink MIMO or MISO signals according to the following non-limiting examples.

In a first example, two analog signal busses (or as many as are used in the downlink distribution) from the uplink signal receivers to the MIMO-capable TRXs 11 can be provided. Signals received from the signal busses are combined by using a weight factor (e.g. sharing weight) that is at least substantially identical to the linear combinations (e.g. mixing weights) used in the downlink direction. As an example, the weight factors may be determined the same way as the metrics described in the above embodiments.

In a second example, all received uplink data signals may be added, although this does involve a risk as phase cancellation may affect (higher) portions of the uplink data signals and result in the accumulation of noise. This approach is particularly attractive if required downlink data rates (e.g. containing large download files or streaming video) are higher than the data rates in the uplink direction.

In a third example, noise gating may be applied to the received uplink data signals. E.g., only strong copies (e.g. signal-to-noise ration or error rate above a predetermined threshold) or the strongest copy of the received uplink data signals signal may be processed. Thereby, a signal-adaptive operation in the uplink direction can be achieved. This avoids accumulation of noise in larger networks.

To summarize, a LiFi system having M multiple TRXs and a single multiple-input-multiple-output (MIMO) modem with at least N transmit branch outputs has been described, wherein the N transmit branch outputs of the MIMO modem are fed to a linear combiner. The linear combiner creates M distinct linear combinations based on the N MIMO outputs of the MIMO modem and the linear combinations are chosen such that they allow decoding of each of the N MIMO signals when N distinct signals out of the M transmit signals are received.

While the invention has been illustrated and described in detail in the drawings and foregoing description, such illustration and description are to be considered illustrative or exemplary and not restrictive. The invention is not limited to the disclosed embodiments. The proposed combination procedures of MIMO or MISO signals can be applied to and possibly standardized in other types of wireless networks and with other types access devices and transceivers. In particular, the invention is not limited to LiFi-related environments, such as the ITU-T G.9961, ITU-T G.9960, and ITU-T G.9991 network environment.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described procedures like those indicated in FIGS. 9 and 11 can be implemented as program code means of a computer program and/or as dedicated hardware of the receiver devices or transceiver devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus for generating M output signals for use in an Optical Wireless Communication (OWC) system,
the OWC system comprising:
an N-output multiple input multiple output modem for communication, with N≥2, for modulating a modem input signal and outputting N transmit branch signals;
M spatially separated optical transmitters, each transmitter configured to emit light based on a respective one of the M output signals, said M transmitters arranged to have multiple overlapping reception areas where light emitted by multiple of the M transmitters may be received,
the apparatus comprising:
an input for receiving the N transmit branch signals;
a combiner for combining the N transmit branch signals via a plurality of linear combinations by combining the N transmit branch signals using selected mixing coefficients to generate the M output signals, each output signal being a different linear combination, and wherein M>N;
wherein the combiner is configured to:
select the mixing coefficients that set the linear combinations so that the likelihood of signal cancellation in overlapping reception areas where light is received from multiple of the M spatially separated transmitters reduced; and
supply the M output signals to the M transmitters for transmission, so that each transmitter receives a different one of the M output signals.

2. The apparatus of claim 1, wherein the combiner is configured to form each one of the M output signals by mixing the N transmit branch signals using N mixing coefficients, the N mixing coefficients of a respective output signal representing a point in an N-dimensional space, and wherein the square of the distance to the origin for each of the respective M points is the same, such that the M output signals are output by the M transmitters using the same output signal power.

3. The apparatus of claim 2, wherein the combiner is configured to combine two transmit branch signals by using the following matrix of mixing coefficients for the M output signals:

$$\begin{bmatrix} 1 & 0 \\ \cos\left(\frac{\pi}{M}\right) & \sin\left(\frac{\pi}{M}\right) \\ \cos\left(\frac{2\pi}{M}\right) & \sin\left(\frac{2\pi}{M}\right) \\ \ldots & \ldots \\ \cos\left(\frac{\pi(M-1)}{M}\right) & \sin\left(\frac{\pi(M-1)}{M}\right) \end{bmatrix}$$

4. The apparatus of claim 1, wherein the combiner is configured to set the linear combinations by corresponding ratios between feedback resistors and input resistors of operational amplifiers.

5. The apparatus of claim 1, wherein the combiner is configured to provide an adaptive setting of the linear combinations by allowing control of switch states of switching elements used for supplying the transmit branch signals to the combiner or for supplying the output signals to the spatially separated transceivers.

6. The apparatus of claim 5, wherein the apparatus is configured to allow control of switches states of switching elements based on a learning or training algorithm or based on a commissioning procedure.

7. A method of controlling an optical wireless communication system, the system comprising:
M spatially separated optical transmitters, each transmitter configured to emit light based on a respective one of the M output signals, said M transmitters arranged to have multiple overlapping reception areas where light emitted by multiple of the M transmitters may be received,
the method comprising:
receiving N transmit branch signals, N≥2, output by an N-output multiple input multiple output, MIMO, modem for communication;
combining the N transmit branch signals via a plurality of linear combinations by combining the N transmit branch signals using selected mixing coefficients to generate the M output signals, each output signal being a different linear combination, and wherein M>N;
setting the linear combinations, by selecting the mixing coefficients so that the likelihood of signal cancellation in overlapping reception areas where light is received from multiple of the M spatially separated transmitters is reduced; and
supplying the M different output signals to the M spatially separated transmitters for transmission.

8. The method of claim 7, wherein the combining comprises:
forming each one of the M output signals by mixing the N transmit branch signals using N mixing coefficients, the N mixing coefficients of a respective output signal representing a point in an N-dimensional space, and wherein the square of the distance to the origin for each of the respective M points is the same, such that the M output signals are output by the M transmitters using the same output signal power.

9. A non-transitory computer readable medium comprising instructions, the instructions when executed by a processor of a computing device cause the computing device to perform the method of claim 8.

10. A method of controlling an optical wireless communication system, the system comprising:
M spatially separated optical transmitters, each transmitter configured to emit light based on a respective one of the M output signals, said M transmitters arranged to have multiple overlapping reception areas where light emitted by multiple of the M transmitters may be received,
the method comprising:
receiving from M spatially separated transmitters of the optical wireless communication system an information indicating its respective identifier and respective selected linear combinations of N transmit branch signals, N≥2, output by an N-output multiple input multiple output, MIMO, modem for communication, wherein the respective selected linear combinations are used to generate the M output signals, based on the N transmit branch signals a communication signal transmitted by a respective one of the M spatially separated transmitters;
comparing selected linear combinations of the N transmit branch signals in signals received in overlapping reception areas of the spatially separated transmitters; and determining linear combinations that need to be changed so that the N transmit branch signals can be generated from the different linear combinations received in overlapping reception areas of the spatially separated transmitters.

11. A non-transitory computer readable medium comprising instructions, the instructions when executed by a processor of a computing device cause the computing device to perform the method of claim 10.

12. An Optical Wireless Communication (OWC) system comprising:
- an N-output multiple input multiple output modem for communication, with N≥2, for modulating a modem input signal and outputting N transmit branch signals;
- M spatially separated optical transmitters, each transmitter configured to emit light based on a respective one of the M output signals, said M transmitters arranged to have multiple overlapping reception areas where light emitted by multiple of the M transmitters may be received; and
- an apparatus for generating the M output signals, the apparatus comprising:
  - an input for receiving the N transmit branch signals;
  - a combiner for combining the N transmit branch signals via a plurality of linear combinations by combining the N transmit branch signals using selected mixing coefficients to generate the M output signals, each output signal being a different linear combination, and wherein M>N;
  - wherein the combiner is configured to:
    - select the mixing coefficients that set the linear combinations so that the likelihood of signal cancellation in overlapping reception areas where light is received from multiple of the M spatially separated transmitters is reduced; and
    - supply the M output signals to the M transmitters for transmission, so that each transmitter receives a different one of the M output signals.

13. An apparatus for providing feedback to an OWC system as claimed in claim 12, comprising:
- a receiver for receiving from the M spatially separated optical transmitters of the optical wireless communication system an information indicating its respective identifier and respective selected linear combinations of N transmit branch signals;
- a memory for storing the identifiers and selected linear combinations and geographical information about the geographical relation between the respective transmitters; and
- a comparator for:
  - comparing selected linear combinations of the N transmit branch signals in signals received in overlapping reception areas of the spatially separated transmitters and
  - determining linear combinations that need to be changed so that the N transmit branch signals can be generated from the different linear combinations received in overlapping reception areas of the spatially separated transmitters wherein the apparatus is configured to signal a feedback signal with a list of combination states to be updated to the M spatially separated transmitters.

14. A commissioning device for commissioning a wireless optical communication system, the commissioning device comprising an apparatus as claimed in claim 12.

15. An apparatus for generating M output signals for use in an Optical Wireless Communication (OWC) system, the OWC system comprising:
- M spatially separated optical transmitters, each transmitter configured to emit light based on a respective one of the M output signals, said M transmitters arranged to have multiple overlapping reception areas where light emitted by multiple of the M transmitters may be received, the apparatus comprising:
- an input for receiving a modem input signal;
- an N-output multiple input multiple output modem for communication, with N≥2, for modulating the modem input signal and outputting N transmit branch signals,
- a combiner for combining the N transmit branch signals via a plurality of linear combinations by combining the N transmit branch signals using selected mixing coefficients to generate the M output signals, each output signal being a different linear combination, and wherein M>N;
- wherein the combiner is configured to:
  - select the mixing coefficients that set the linear combinations so that the likelihood of signal cancellation in overlapping reception areas where light is received from multiple of the M spatially separated transmitters is reduced; and
  - supply the M output signals to the M transmitters, so that each transmitter receives a different one of the M output signals.

* * * * *